(12) United States Patent
Bourque et al.

(10) Patent No.: US 7,029,055 B2
(45) Date of Patent: Apr. 18, 2006

(54) SLIDABLE WINDOW ASSEMBLY WITH VENT SCREEN

(75) Inventors: Jeffrey Gerard Bourque, Novi, MI (US); Paul Joseph Kolokowski, Southgate, MI (US); Michael James Lesle, Toledo, OH (US); Larry R. Lyke, Novi, MI (US); Thomas William Peyton, Jr., Allen Park, MI (US); Scott Saxon, Northville, MI (US); Marcus Tanksley, Farmington Hills, MI (US); Rick Mark Weinert, Novi, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 0 days.

(21) Appl. No.: 10/695,116

(22) Filed: Oct. 28, 2003

(65) Prior Publication Data

US 2004/0100121 A1    May 27, 2004

Related U.S. Application Data

(60) Provisional application No. 60/429,813, filed on Nov. 27, 2002.

(51) Int. Cl.
*B60J 1/00*        (2006.01)
(52) U.S. Cl. .................... 296/146.16; 160/99
(58) Field of Classification Search ............ 296/146.1, 296/146.15, 146.16; 160/99, 100, 27, 28
See application file for complete search history.

(56) References Cited

U.S. PATENT DOCUMENTS

| 1,509,450 A | 9/1924 | Sweeney |
| 1,569,118 A | 1/1926 | Curtis |
| 1,593,324 A | 7/1926 | Anderson |
| 1,595,274 A | 8/1926 | White |
| 1,904,968 A | 4/1933 | Bredin |
| 1,969,521 A | 8/1934 | Oman |
| 1,971,451 A * | 8/1934 | Helfmann ..................... 160/28 |
| 2,406,761 A * | 9/1946 | Golkowski .................. 160/100 |
| 2,462,520 A * | 2/1949 | Marbach ..................... 160/100 |
| 2,760,568 A | 8/1956 | Smiraldo |
| 3,155,146 A * | 11/1964 | Malouf et al. ................ 160/27 |
| 3,173,474 A * | 3/1965 | Wootten ...................... 160/27 |
| 3,470,934 A * | 10/1969 | Agnew ........................ 160/27 |
| 3,805,872 A | 4/1974 | Lorber |
| 3,911,990 A * | 10/1975 | Hoover et al. .............. 160/100 |
| 4,124,054 A * | 11/1978 | Spretnjak ..................... 160/90 |
| 4,185,679 A * | 1/1980 | Weir ........................ 160/231.2 |
| 4,359,081 A * | 11/1982 | Brower ....................... 160/243 |
| 4,393,753 A | 7/1983 | Chatlos |
| 4,497,515 A | 2/1985 | Appelson |
| 4,707,018 A | 11/1987 | Gavagan |
| 4,819,295 A * | 4/1989 | Kaftan .......................... 16/72 |
| 4,936,368 A | 6/1990 | Philbeck et al. |

(Continued)

*Primary Examiner*—H. Gutman
(74) *Attorney, Agent, or Firm*—MacMillan, Sobanski & Todd, L.L.C.

(57) ABSTRACT

A window assembly for a motor vehicle includes an opening defined by a pair of spaced apart stationary windows. Above and below the opening are a pair of opposing horizontal guide rails within which a moveable window slides allowing the opening to be selectively covered or uncovered. Attached to the moveable window is a vent screen, the other end of which is attached to a retraction device mounted adjacent to the opening. When the moveable window is opened, the vent screen uncoils from the retraction device, covering the opening. When the window is closed, the retraction device automatically spools and stores the screen.

18 Claims, 3 Drawing Sheets

U.S. PATENT DOCUMENTS

| | | | |
|---|---|---|---|
| 5,192,112 A | 3/1993 | Gherardi et al. | |
| 5,392,835 A * | 2/1995 | Wildt | 160/269 |
| 5,469,906 A | 11/1995 | Cason | |
| 5,575,524 A * | 11/1996 | Cronk | 296/142 |
| 5,799,449 A * | 9/1998 | Lyons et al. | 52/204.51 |
| 5,915,443 A * | 6/1999 | Lindley, Jr. | 160/100 |
| 6,016,861 A | 1/2000 | Davis | |
| 6,082,432 A * | 7/2000 | Kissinger | 160/290.1 |
| 6,089,302 A * | 7/2000 | Britt | 160/98 |
| 6,125,585 A * | 10/2000 | Koneval et al. | 49/349 |
| 6,223,803 B1 * | 5/2001 | Nielsen | 160/98 |
| 6,240,996 B1 | 6/2001 | Runions | |
| 6,276,426 B1 | 8/2001 | Polak | |
| 6,463,983 B1 * | 10/2002 | Lang | 160/23.1 |
| 6,478,070 B1 * | 11/2002 | Poppema | 160/23.1 |
| 6,629,555 B1 * | 10/2003 | DeBlock et al. | 160/31 |
| 6,701,994 B1 * | 3/2004 | Goldenberg et al. | 160/31 |
| 6,814,127 B1 * | 11/2004 | Tagtow et al. | 160/31 |

* cited by examiner

SLIDABLE WINDOW ASSEMBLY WITH VENT SCREEN

CROSS REFERENCE TO RELATED APPLICATION

This application claims the benefit of U.S. provisional application No. 60/429,813 filed Nov. 27, 2002, which is herein incorporated by reference.

BACKGROUND

1. Field of the Invention

The present invention generally relates to window assemblies for motor vehicles. More specifically, the invention relates to a window and vent screen assembly for a sliding window, such as those commonly found as the back light or rear window of pick-up trucks and other vehicles.

2. Description of Related Art

Various types of motor vehicles include window assemblies of the sliding window variety. Such rear window assemblies open by means of one or two laterally moveable windows (hereinafter just "window"). The moveable window is moveable such that it can selectively cover an opening defined within a single stationary window or between a pair of stationary windows. When the rear window assembly is in the open position, however, debris located in the bed of the truck can be drawn into the passenger compartment. Such debris may include items such as dirt, leaves, sticks, paper, and insects.

Several screen assemblies for the rear window of a pick-up truck are known. These screen assemblies typically include a frame that is mountable within the opening of the rear window assembly. As such, the screen assembly may include a frame having a bias means associated therewith to allow the frame to compress slightly and assist in the installation or removal of the screen from the window opening.

Window screens of the above varieties have numerous disadvantages. For example, when installed such screen assemblies are fixedly mounted and prevent an occupant in the passenger compartment of the truck from conveniently accessing items stored in the cargo box through the window. Further, when use of the screen is desired or when use of the screen is not desired, it cannot be conveniently installed.

In view of the above, it is apparent that there exists a need for an improved window assembly and vent screen for the sliding windows of vehicles, such as pick-up trucks.

SUMMARY

In satisfying the above need, as well as overcoming the enumerated drawbacks and other limitations of the related art, the present invention provides a sliding window assembly with a vent screen for a motor vehicle such as a pick-up truck. In particular, a sliding window assembly is provided with a retractable vent screen. In the closed position of the sliding window, the screen panel is retracted within a housing by a retraction device. When spooled within the housing, the screen panel is concealed and the vent screen is small enough that it does not inhibit the rear view through the sliding window. Upon movement of the sliding window to uncover and open the window assembly, the screen panel is automatically drawn out of the housing and extended over the opening of the window assembly. This screen panel is permeable and allows air to readily flow into the passenger compartment of the vehicle while at the same time providing a barrier to the introduction of debris from the cargo box.

In providing a window assembly in accordance with the principles of the present invention, the window assembly is seen as including as its primary components a pair of stationary windows, a pair of spaced apart track members, a moveable window and a retractable vent screen.

The stationary windows, which may be portions of a single fixed window, are spaced apart and define an opening therebetween. The opening itself provides for communication and access between the interior passenger compartment of the vehicle and the exterior of the vehicle specifically the cargo box or bed of the vehicle when the vehicle is a pick-up truck.

The spaced apart track members are generally horizontally oriented and positioned such that they extend across the opening defined between the stationary windows. Each of the track members is of a three walled construction and defines a channel, the channel of each track member counter-facing the channel of the other track member.

Slidingly received within the channels of the track members is a moveable window. The moveable window is moveable in a lateral direction, relative to the vehicle, in the channels so as to selectively cover or uncover the opening defined by the stationary windows.

The vent screen includes, in addition to the housing and screen panel mentioned above, a retraction device. One end of the screen panel is attached to the moveable window while the opposing end of the screen panel is connected to the retraction device. The retraction device is provided in such a manner that the screen panel will be automatically spooled or wound up thereby.

In operation, displacement of the moveable window from a closed position to an open position causes the screen panel to be drawn out of the housing and over the opening between the stationary windows. Displacement of the moveable window from this open position to a closed position covering the opening allows the screen panel to be automatically spooled by the retraction device into a stored position within the housing.

In addition to forming an obstruction to the entry of debris into the passenger compartment of the vehicle, the screen panel also operates as a sun shade. In so doing, the screen panel offers protection from the potential adverse effects of sunlight to the interior seating/trim and the occupants of the vehicle.

In an alternative embodiment, the vent screen is removable mounted to the remainder of the window assembly. This allows for the vent screen to be readily removed from the window assembly in situations where it is so desired.

Further objects, features and advantages of this invention will become readily apparent to persons skilled in the art after a review of the following description, with reference to the drawings and claims that are appended to and form a part of this specification.

DETAILED DESCRIPTION

Figure 1:
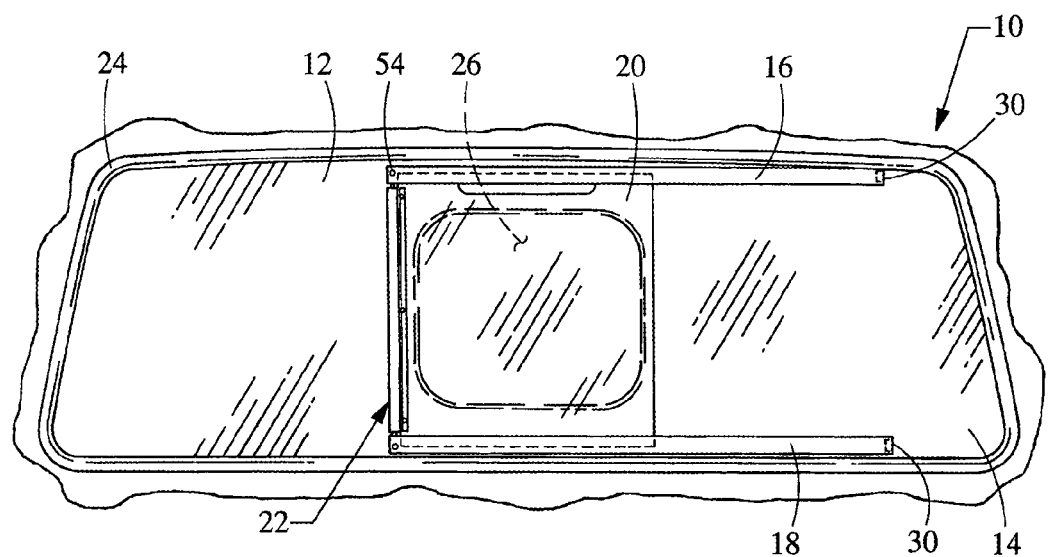
FIG. 1 is plan view of a window assembly embodying the principles of the present invention and illustrating the sliding window in a closed position and the vent screen in a retracted position.

Referring now to the drawings, a sliding window assembly embodying the principles of the present invention is illustrated in FIG. 1 and generally designated at 10. As its primary components, the window assembly 10 includes a pair of stationary windows 12, 14, a pair of guide rails 16, 18, a moveable window 20 and a screen assembly 22. The entire window assembly 10, is mounted as the rear window, i.e. as a back light window, in a pick-up truck or other vehicle (not shown).

Figure 2:
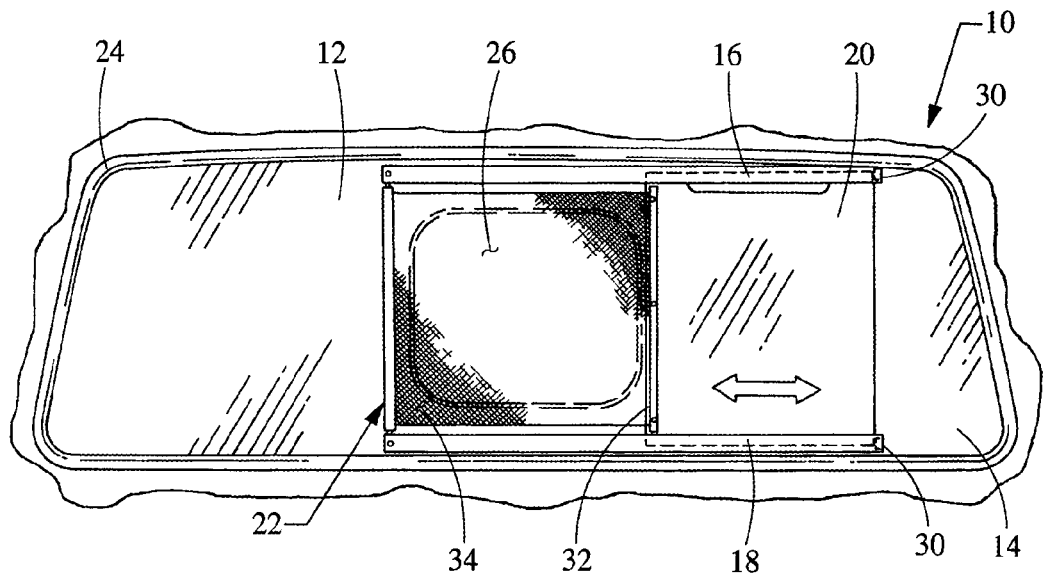
FIG. 2 is a plan view of the window assembly seen in FIG. 1 with the slideable window moved into an open position and the vent screen being extended to a position over the opening in the window assembly.

The stationary windows 12, 14 are supported within a frame 24 or other structure utilized to mount the assembly 10 in window frame of the pick-up truck. In general, the stationary windows 12, 14 are spaced apart and located on opposing ends of the window assembly 10 so as to include portions defining an opening 26 centrally therebetween. While the stationary windows 12, 14 may be formed as individual panes of glass, or other transparent material, the stationary windows 12, 14 can be formed as a unitary structure, as seen in FIGS. 1 and 2, with the opening 26 centrally formed therein.

The moveable window 20 is mounted with respect to the stationary windows 12, 14 such that the moveable window 20 can selectively cover or uncover the opening 26. As illustrated in FIG. 1, the moveable window 20 is in a "closed" position covering the opening 26. As seen in FIG. 2, the moveable window 20 is in an "open" position where the opening 26 is uncovered.

In order to mount the moveable window 20 and to permit the desired movement between the closed and open positions, the moveable window 20 is supported by the guide rails 16, 18. The guide rails 16, 18 are each permanently affixed to the stationary windows 12, 14 by means of adhesive or other conventional fastening techniques. Generally, the guide rails 16, 18 are mounted horizontally with respect to the window assembly 10 and are oriented parallel to one another.

The guide rails 16, 18 are each three walled structures, having side walls 19 connected by a base wall 21 so as to define a channel 28 into which the moveable window 20 is slidingly received. Accordingly, the mounting of the guide rails 16, 18 to the stationary windows 12, 14 is such that the channels 28 of each guide rail 16, 18 are counter-facing one another.

When moved into the open position, the moveable window 20 engages stops 30 fixedly received in the end of the guide rails 16, 18 so as to prohibit further movement of the moveable window 20. In this position, the trailing edge 32 of the moveable window 20 is located at a position beyond or outside of the opening 26.

In order to prevent debris from entering into the occupant compartment of the vehicle through the opening 26 when the moveable window 20 is in its open position, the vent screen 22 is provided in such a manner that a screen panel 34 is moved over the opening 26 as the moveable window 20 is moved to its uncovered or open position. Conversely the screen panel 34 is automatically retracted or spooled when the moveable window 20 is moved to its covered or closed position over the opening 26.

To accomplish the above, the vent screen 22 includes a roller shaft 36 to which one end 38 of the screen panel 34 is permanently mounted. The roller shaft 36 is supported in a housing 40 so as to be rotatable with respect to the housing 40. Also located within the housing 40 is a biasing member 42. The biasing member 42 provides a rotational biasing force between the housing 40 and roller shaft 36 causing the roller shaft 36 to rotate relative to the housing 40. Support of the roller shaft 36 within the housing 40 can be achieved in any manner that will permit and enable rotation of the roller shaft 36 relative to the housing 40.

Figure 4:
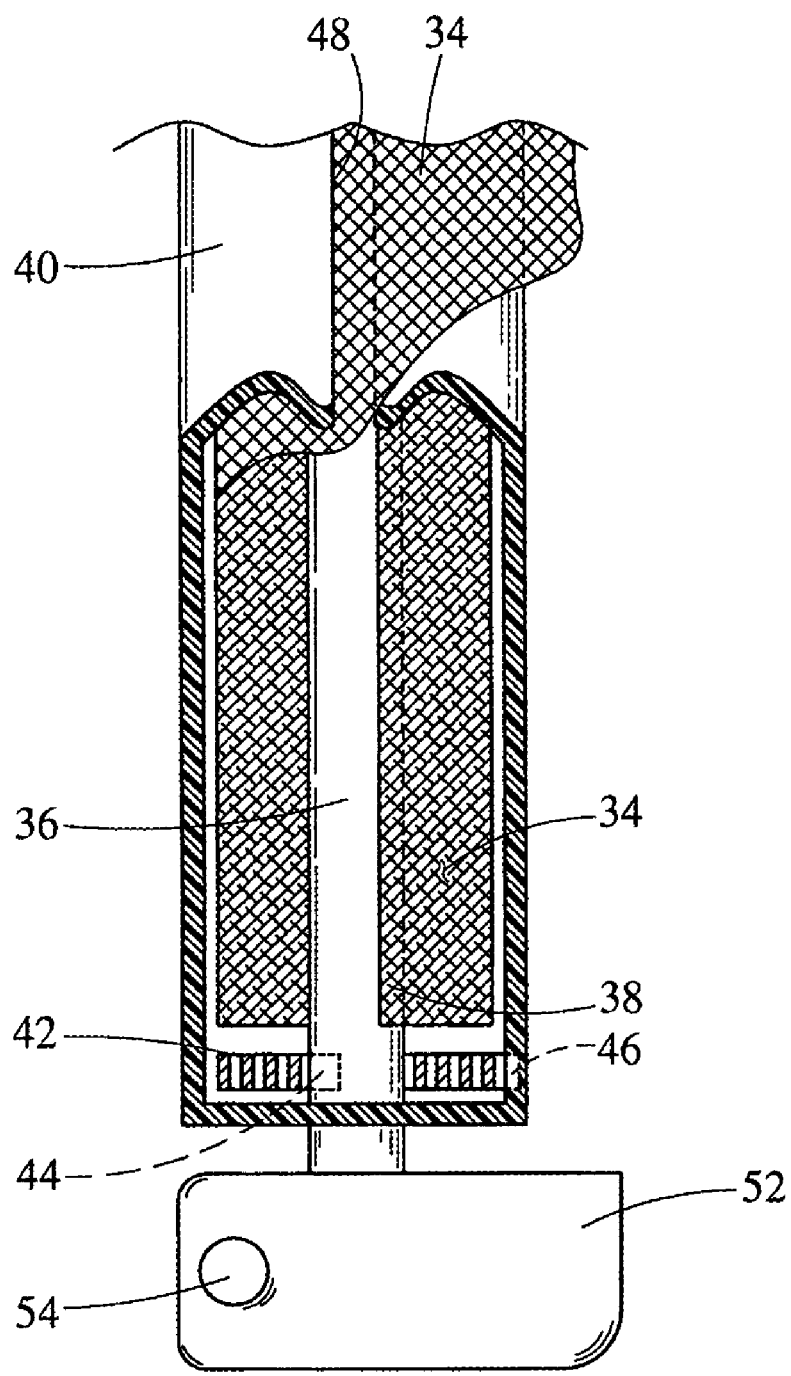
FIG. 4 is a partial view of the vent screen with portions broken away to illustrate some of the details of the internal construction of the vent screen.

As seen in FIG. 4, the biasing member 42 is a coil spring, the inner end 44 of which is secured to the roller shaft 36 and the outer end 46 of which is secured to the housing 40. Under the influence of the biasing member 42, the screen panel 34 is accordingly spooled or wound onto the roller shaft 36. To enable entrance of the screen panel 34 into the housing 40, a slot 48 is provided in the housing 40.

The vent screen 22 may be supported in various ways with respect to the moveable window 20. In one embodiment, the vent screen 22 may be fixedly mounted or removeably mounted to the stationary window 12 at a location adjacent to the opening 26. In another embodiment, and as illustrated in the figures, the vent screen 22 is removeably mounted between the guide rails 16, 18.

In mounting the screen assembly 22 to the guide rails 16, 18, the ends of the guide rails 16, 18 adjacent to the opening 26 are provided with apertures 50 in the sidewall 19 thereof. The vent screen 22 is provided, on opposing ends thereof, with an end block 52. The end blocks 52 are mounted to the housing 40 and are profiled so as to enable them to be received within the channels 28 of the guide rails 16, 18. The retaining of the end blocks 52 within the channels 28, the end blocks 52 are further provided with spring biased plungers 54. The spring biased plungers 54 are of a conventional construction and are located on the end blocks 52 so as to correspond with the apertures 50 in the guide rails 16, 18 and so as to be biased into engagement therewith as the end blocks 52 are slid into the channels 28. When located in the guide rails 16, 18, the end blocks 52 also operate as end stops limiting movement of the moveable window 20 in the direction thereof. Obviously, to remove the vent screen 22 from the remainder of the window assembly 10, the plungers 54 are depressed and the vent screen 22 is slid in a lateral direction (to the left in FIGS. 1 and 2) out of the ends of the guide rails 16, 18.

As previously stated, one end 38 of the screen panel 34 is secured to the roller shaft 36. The opposing end 56 of the screen panel 34 is attached to the moveable window 20, adjacent to the trailing edge 32. This end 56 of the screen panel 34 can be secured to the moveable window 20 in a variety of ways, including permanently adhering this end 56 to the moveable window 20. In a preferred construction, however, this end 56 of the screen panel 34 is removeably attached to the moveable window 20.

Figure 3:
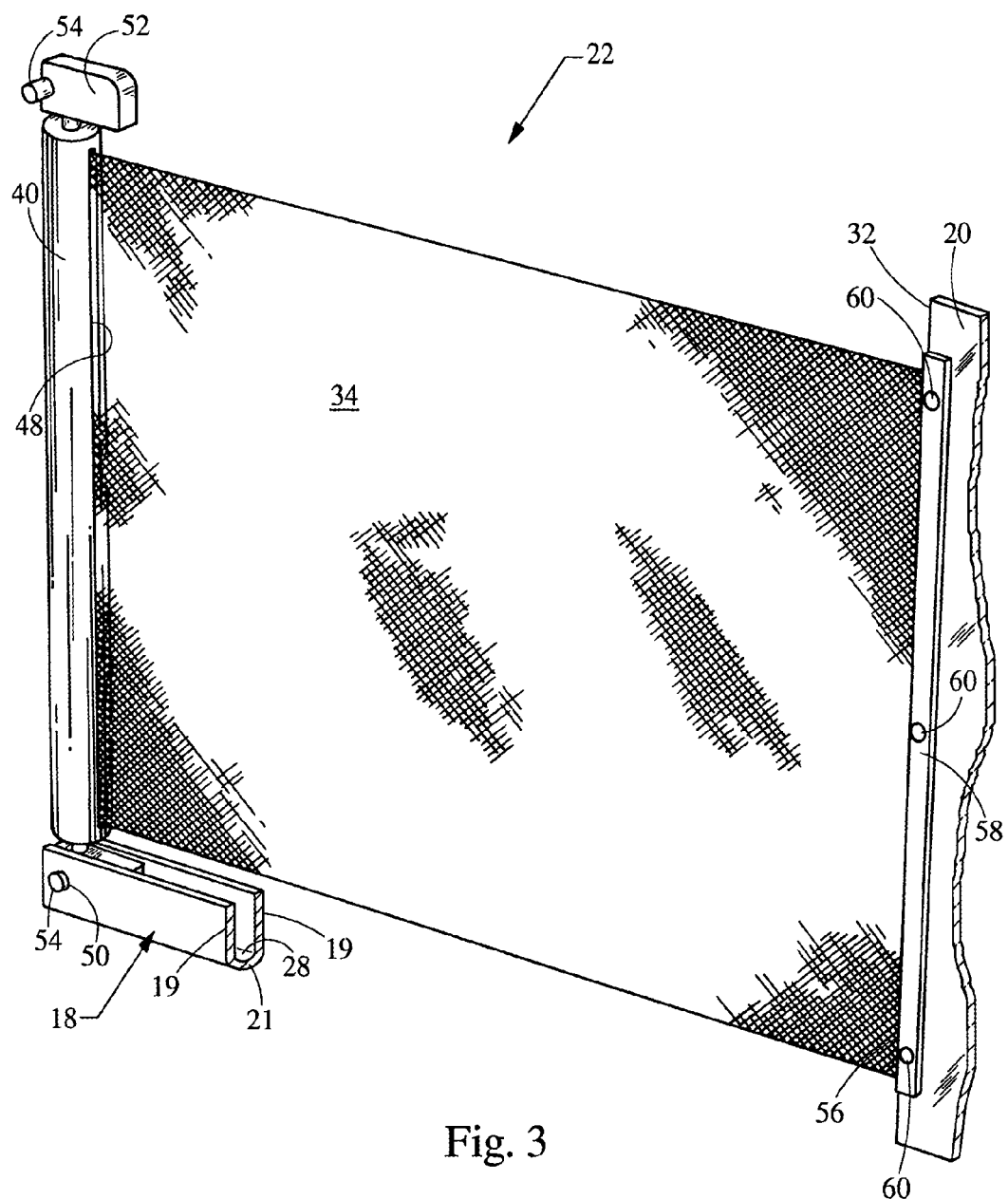
FIG. 3 is a perspective view of the vent screen seen in FIGS. 1 and 2 and shown in its extended position.

One such possible construction for the removable attachment of the screen panel 34 to the moveable window 20 is seen in FIG. 3. As seen therein, the end 56 of the screen panel 34 is provided with a stay 58 or other reinforcing member. The stay may be constructed in a number of ways, including two pieces of plastic snap-fit together with the end 56 of the screen panel 34 impinged and retained therebetween. In order to mount the stay 56 to the moveable window 20, corresponding portions of snaps 60, or any other releasable fasteners, are respectively provided on the stay 58 and on the moveable window 20.

In this manner, when it is desired to have access through the opening 26 of the window assembly 10, the screen panel 34 may be disconnected from the moveable window 20 by disengaging the corresponding portions of the snaps 60 located on the stay 58 and the moveable window 20. With the snaps 60 disconnected, the screen panel 34, under the influence of the biasing member 42, will be spooled into the housing 40 and onto the roller shaft 36. Preferably, the stay 58 is sized such that upon full winding of the screen panel 34 onto the roller shaft 37, the stay will engage the housing 40 adjacent to the slot 48, being too large to pass through the slot 48.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A window assembly for a motor vehicle comprising:
    a pair of stationary windows, said stationary windows being spaced apart and having side portions defining an opening therebetween, said opening adapted to provide communication between an interior passenger compartment of the vehicle and the exterior of the vehicle;
    a pair of spaced apart guide rails, said guide rails horizontally extending across said opening and each including portions defining a channel, said channel of one of said guide rails counter-facing said channel of the other of said guide rails, said guide rails extending between first ends proximate to one side portion and second ends positioned beyond the other side portion;
    a moveable window slidingly received within said channels of said guide rails, said moveable window being moveable in a lateral direction to selectively cover said opening in a closed position with said moveable window nearest said first ends and selectively uncover said opening in an open position with said moveable window nearest said second ends;
    a vent screen having a retraction device and a screen panel, said retraction device being supported by and mounted to and between said first ends of said guide rails and connected to a first end of said screen panel and adapted to automatically spool said screen panel, said screen panel further including a second end attached to said moveable window; and
    whereby displacement of said moveable window from said closed position to said open position causes said screen panel to be extended over said opening, and whereby displacement of said moveable window to a closed position allows said screen panel to be spooled by said retraction device.

2. The window assembly of claim 1 wherein said retraction device includes a biasing member coupled to a support rod, said rod being connected to said first end of said screen panel.

3. The window assembly of claim 2 wherein said biasing member exerts a biasing force in a direction causing said screen panel to be spooled onto said rod.

4. The window assembly of claim 3 wherein said biasing force is continuously applied.

5. The window assembly of claim 1 wherein said second end of said screen panel is removeably attached to said moveable window.

6. The window assembly of claim 1 wherein said second end of said screen panel is attached to said moveable window along an edge of said moveable window.

7. The window assembly of claim 1 wherein said vent screen is removeably mounted to the remainder of said window assembly.

8. The window assembly of claim 7 wherein said vent screen is removeably mounted to said guide rails.

9. The window assembly of claim 1 wherein said retraction device of said vent screen is removeably mounted to said guide rails in a fixed position at said first ends of said guide rails.

10. The window assembly of claim 1 wherein said retraction device includes a coil spring as a biasing member adapted to cause spooling of said screen panel.

11. In combination with a motor vehicle window assembly having a moveable window slidingly received within first and second counter-facing channels of spaced apart guide rails extending generally across an opening defined between two side portions of spaced apart stationary windows, said guide rails extending between first ends proximate to one side portion and second ends positioned beyond the other side portion, the moveable window being selectively moveable between a closed position covering the opening with said moveable window nearest said first ends and an open position uncovering the opening with said moveable window nearest said second ends, a vent screen comprising:
    a screen panel having a first end connected to a retraction device and a second end connected to said moveable window, said retraction device being supported by and mounted to and between said first ends of said guide rails and including a biasing member exerting a biasing force in a direction to cause said screen panel to be spooled, whereby displacement of said moveable window from the closed position to the open position causes said screen panel to be extended over said opening, and whereby displacement of said moveable window from the open position to the closed position covering said opening of said window assembly causes said screen panel to be spooled by said retraction device.

12. The combination of claim 11 wherein said retraction device is removeably mounted adjacent to the side portion of said stationary windows.

13. The combination of claim 11 wherein said biasing member is coupled to a support rod, said first end of said screen panel being connected to said support rod.

14. The combination of claim 13 wherein said screen panel is spooled onto said rod.

15. The combination of claim 11 wherein said biasing force is continuously applied.

16. The combination of claim 11 wherein said second end of said screen panel is removeably attached to said moveable window.

17. The combination of claim 11 wherein said second end of said screen panel is attached to said moveable window along an edge of said moveable window.

18. The combination of claim 11 wherein said vent screen is removeably mounted to said first ends of said guide rails.

* * * * *